United States Patent
Gamage et al.

(10) Patent No.: US 8,472,540 B2
(45) Date of Patent: Jun. 25, 2013

(54) FREQUENCY AND TIMING OFFSET ESTIMATION ALGORITHM FOR DTV (DVB-T2) RECEIVERS

(75) Inventors: Sahan S. Gamage, Hardwick (GB); Bernard Arambepola, Middlesex (GB); Thushara Hewavithana, Borhamwood (GB); Parveen K. Shukla, Nottingham (GB)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 12/956,565

(22) Filed: Nov. 30, 2010

(65) Prior Publication Data

US 2012/0134398 A1 May 31, 2012

(51) Int. Cl.
 *H04K 1/10* (2006.01)
(52) U.S. Cl.
 USPC ........... 375/260; 375/267; 375/340; 375/343; 375/346; 375/350; 375/316
(58) Field of Classification Search
 USPC .............. 375/224, 260, 262, 267, 316, 340, 375/343, 346, 350; 370/203, 204, 205, 208, 370/209, 210
 See application file for complete search history.

(56) References Cited

U.S. PATENT DOCUMENTS

| | | | |
|---|---|---|---|
| 6,219,333 B1 * | 4/2001 | Ahn | 370/203 |
| 7,940,849 B1 * | 5/2011 | Fang et al. | 375/260 |
| 2007/0160158 A1 * | 7/2007 | Zeng et al. | 375/260 |
| 2009/0154589 A1 | 6/2009 | Monnerie | |
| 2009/0175367 A1 * | 7/2009 | Kishigami et al. | 375/260 |
| 2010/0039286 A1 | 2/2010 | Robbins | |

OTHER PUBLICATIONS

International Search Report and Written Opinion mailed Feb. 17, 2012, for PCT/US2011/059929.

* cited by examiner

*Primary Examiner* — Dhaval Patel
(74) *Attorney, Agent, or Firm* — Pillsbury Winthrop Shaw Pittman LLP

(57) ABSTRACT

According to various embodiments, a method is disclosed that includes a method is disclosed that includes determining, by a receiver, a frequency offset in a signal comprising a set of orthogonal frequency division multiplexed (OFDM) symbols by determining a first difference in phase angles between a $n^{th}$ OFDM symbol and a $n^{th}+1$ OFDM symbol on a common OFDM carrier and a first difference in phase angles between the $n^{th}+1$ OFDM symbol and a $n^{th}+2$ OFDM symbol on the common OFDM carrier and determining a second difference in phase angles between the first difference in phase angles between the $n^{th}$ OFDM symbol and the $n^{th}+1$ OFDM system and the first difference in phase angles between the $n^{th}+1$ OFDM symbol and the $n^{th}+2$ OFDM symbol to identify the frequency offset, wherein $n \in \{1, \ldots, N\}$; and correcting, by the receiver, the signal using the determined frequency offset.

20 Claims, 3 Drawing Sheets

Carrier k

Symbol 1 ■ $R_k^1 \exp(j\phi_k^1)$ $\Delta\phi_k^2 = \phi_k^2 - \phi_k^1$

Symbol 2 ■ $R_k^2 \exp(j\phi_k^2)$ $\Delta^2\phi_k^3 = \Delta\phi_k^3 - \Delta\phi_k^2$ $\Delta\phi_k^3 = \phi_k^3 - \phi_k^2$ Symbol 3 ■ $R_k^3 \exp(j\phi_k^3)$ $\Delta^2\phi_k^4 = \Delta\phi_k^4 - \Delta\phi_k^3$ $\Delta\phi_k^4 = \phi_k^4 - \phi_k^3$ Symbol 4 ■ $R_k^4 \exp(j\phi_k^4)$ $\Delta^2\phi_k^5 = \Delta\phi_k^5 - \Delta\phi_k^4$ $\Delta\phi_k^5 = \phi_k^5 - \phi_k^4$ Symbol 5 ■ $R_k^5 \exp(j\phi_k^5)$ $\Delta^2\phi_k^6 = \Delta\phi_k^6 - \Delta\phi_k^5$ $\Delta\phi_k^6 = \phi_k^6 - \phi_k^5$ Symbol 6 ■ $R_k^6 \exp(j\phi_k^6)$

Figure 3

FREQUENCY AND TIMING OFFSET ESTIMATION ALGORITHM FOR DTV (DVB-T2) RECEIVERS

FIELD

This disclosure relates generally to the field of digital video broadcasting (DVB), and in particular to a method and device arranged to determine frequency and timing offset estimation for digital television (DTV) receivers.

BACKGROUND

DVB is the European consortium standard for the broadcast transmission of digital terrestrial television. DVB systems transmit a compressed digital audio/video stream, using multi-carrier modulation, such as orthogonal frequency division multiplexing (OFDM). Another popular method of transmitting signals is digital video broadcasting-terrestrial (DVB-T). When broadcasters employ DVB-T, the transmitted signals do not travel via cable. Instead, they move via aerial antennas to a home based receiver.

DVB-T broadcasters transmit data with a compressed digital audio-video stream using a process based on a Moving Picture Expert Group (MPEG)-2 standard. These transmissions can include all kinds of digital broadcasting, including high definition television (HDTV). MPEG-2 signals represent an improvement over the older analog signals, which require separate streams of transmission.

By way of background, in multi-carrier systems, such as OFDM systems, serially-inputted symbol streams are divided into unit blocks. The symbol streams of each unit block are converted into N number of parallel symbols. After the conversion, these symbols, which include data, are multiplexed and added by using a plurality of subcarriers having different frequencies, respectively, according to an Inverse Fast Fourier Transform (IFFT) technique, and are transmitted via the channel in time domain.

In addition to data, these OFDM symbols also include scattered pilot carriers (SPC), continuous pilot carriers (CPC), and reserve tone pilot carriers. These pilot carriers (signals) are used for frame synchronization, frequency synchronization, time synchronization, channel estimation, transmission mode identification, and/or phase noise tracing. The data and the pilot carriers constitute the useful part of the OFDM symbol. As understood by those of skill in the art, these OFDM symbols also include a guard interval.

Once the OFDM symbols are captured on a receiver side of the OFDM system, they must be demodulated. OFDM demodulation procedures include, for example, a Fast Fourier Transform (FFT) step, an equalizing and de-interleaving step, and a synchronizing step, among others.

Synchronization of OFDM receivers is performed to locate the useful part of each symbol to which the FFT is to be applied. This synchronization, generally performed in the time domain, can be characterized as coarse synchronization (e.g., initially performed during an acquisition period) and fine synchronization. Fine synchronization improves upon the results achieved during coarse synchronization enough to provide reliable demodulation. Time domain correlation is used to achieve initial symbol timing synchronization. This process may also be used to detect the guard ratio of the OFDM transmission. However, there could be an ambiguity in closely spaced guard ratios worked out using this method.

In DTV receivers there can be significant timing and frequency offsets at the input to the demodulator due to the tuning step sizes and due to tolerances of the reference frequency sources used in low cost consumer applications. These errors are operating temperature and ageing dependent. Good DTV receiver designs are expected to estimate and correct for relatively large offsets without any external help and without any impact on acquisition time.

In DVB-T2 initial frequency offset estimation is carried out using the P1 preamble OFDM symbol. However, the P1 symbol is 1K OFDM and hence the accuracy of this frequency estimate is inadequate for 16K and 32K OFDM. Frequency estimation may be improved using continuous pilots. However, DVB-T2 has eight possible pilot patterns. The pilot pattern that is used is signaled, but to get at this signaling data it is necessary to do LDPC decoding. LDPC decoding will not work if there is a frequency offset because the decoded OFDM carriers will be wrong. Furthermore, there could be ambiguities in the guard interval. The guard interval is initially estimated using time domain correlation, but under noisy conditions it is not practical to differentiate between closely spaced guard ratios like 1/16 and 19/256.

The algorithm proposed does frequency offset estimation, pilot pattern detection, spectral inversion resolution, accurate guard ratio estimation and timing error estimation for DVB-T2 without the need to extract any signaling information via LDPC decoding. Hence the demodulation synchronization algorithm can be implemented in the programmable processor before activating the LDPC hardware engine. This simplifies the implementation and reduces the acquisition time. This algorithm is also applicable to DTV receivers like ISDB-T and DVB-T that do not have preamble symbols or LDPC decoders. Given the above problem of the conventional technique, improvements are needed.

BRIEF DESCRIPTION OF THE DRAWINGS

FIG. 3 shows one vertical column of the OFDM symbols including the computation of the first and second difference in phase angles between consecutive OFDM symbols of FIG. 2.

DETAILED DESCRIPTION

Description

Figure 1:
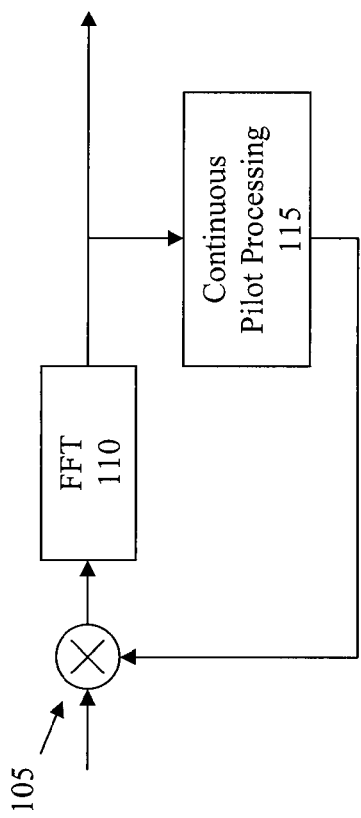
FIG. 1 shows an example and simplified block diagram of the frequency offset correction in the receiver in accordance with various aspects of the present disclosure.

In accordance with some aspects of the present disclosure, a method, computer program product configured to perform the method and a receiver configured to operate using the method are disclosed. The method includes determining, by a receiver, a frequency offset in a signal comprising a set of orthogonal frequency division multiplexed (OFDM) symbols by determining a first difference in phase angles between a $n^{th}$ OFDM symbol and a $n^{th}+1$ OFDM symbol on a common OFDM carrier and a first difference in phase angles between the $n^{th}+1$ OFDM symbol and a $n^{th}+2$ OFDM symbol on the common OFDM carrier and determining a second difference in phase angles between the first difference in phase angles between the $n^{th}$ OFDM symbol and the $n^{th}+1$ OFDM system and the first difference in phase angles between the $n^{th}+1$ OFDM symbol and the $n^{th}+2$ OFDM symbol to identify the frequency offset, wherein $n \in \{1, \ldots, N\}$; and correcting, by the receiver, the signal using the determined frequency offset.

In some aspects, the method can include determining a first difference in phase angles between the $n^{th}+2$ OFDM symbol and a $n^{th}+3$ OFDM symbol on the common OFDM carrier and determining a second difference in phase angles between the first difference in phase angles between the $n^{th}+1$ OFDM symbol and the $n^{th}+2$ OFDM system and the first difference in phase angles between the $n^{th}+2$ OFDM symbol and the $n^{th}+3$ OFDM symbol. The method can be repeated by determining the first difference and the second difference in phase angles for each OFDM symbol in the set $n \in \{1, \ldots, N\}$.

The method can also include determining if the common carrier in the $n^{th}$, $n^{th}+1$ and $n^{th}+2$ OFDM symbols corresponds to a continuous pilot (CP) based on the determined second difference in phase angles.

The method can also include converting one or more OFDM carriers signals in the OFDM symbols from a Cartesian to a Polar coordinate system according to $(x+jy)_k^n \rightarrow R_k^n \exp(j\Phi_k^n)$ where $\Phi_k^n$ is the phase angle of carrier at frequency bin k in the OFDM symbol number n and $R_k^n$ is the amplitude of carrier at frequency bin k in the OFDM symbol number n.

The method can also include converting the second difference of the phase angle to Cartesian coordinates according to $\exp(j\Delta^2\Phi_k^n) \rightarrow (p+jq)_k^n$ where $\Phi_k^n$ is the phase angle of carrier at frequency bin k in the OFDM symbol number n.

The method can also include averaging $(p+jq)_k^n = (x+jy)_k^n (x-jy)_k^{n-1}(x-jy)_k^{n-1}(x+jy)_k^{n-2}$ where $(x+jy)_k^n$ is the carrier at frequency bin k in the OFDM symbol number n.

The method can also include averaging complex exponential functions of the determined second difference in phase angles over a known pattern of CP indices, wherein the averaging can include a weighted average based on an average amplitude of each OFDM carrier.

The method can also include determining an offset that maximizes the magnitude of the average of the complex exponentials of the determined second difference weighted by the average amplitude of each OFDM carrier.

The method can also include determining a candidate set of continuous pilots corresponding to a frequency offset u and a pilot pattern v that maximizes $$\text{Abs\_Sum}(u, v) = \frac{1}{\text{Number\_of\_CPs}(v)} \left| \sum_{k \in \{CP\_indices(v)+u\}} (p+jq)_k \right|,$$

where Number_of_CPs(v) is the number of CPs of the pilot pattern v.

The method can also include determining a complex conjugate of a time domain signal prior to performing a FFT if the expression Abs_Sum(u,v) does not met a predetermined threshold requirement.

The method can also include determining the guard ratio based on $\Delta\Phi_k^n$ by determining a slope of $\Delta\Phi_k^n$ as a function of frequency index k.

In DVB-T2 the locations of continuous pilots (CP) will not be known at the start for two reasons. First is that there are eight possible pilot patterns and second is that the frequency offset in the signal is not known. The term "continuous pilots" refer to pilots that occur at the same frequency in every OFDM symbol. Note that the CP density of DVB-T2 is about 25% of that in DVB-T.

FIG. 1 shows an example and simplified block diagram of the frequency offset correction in the receiver in accordance with various aspects of the present disclosure. The number that flow through the components of FIG. 1 are all complex number. Not shown in FIG. 1 include components such as an analog-to-digital converter (ADC) and one or more digital filters, which could be arranged before complex multiplier module 105. Complex multiplier module 105 is arranged to perform a frequency translation or frequency offset correction of the signal by sliding the spectrum up and down in frequency. Fast Fourier Transform (FFT) module 110 is arranged to receive the output from complex multiplier module 105 and take the signal from the time to frequency domain to get the OFDM carriers (shown in FIG. 2). Continuous Pilot Processing module 115 is arranged to receive the output from FFT module 110 and input back to complex multiplier module 105.

Figure 2:
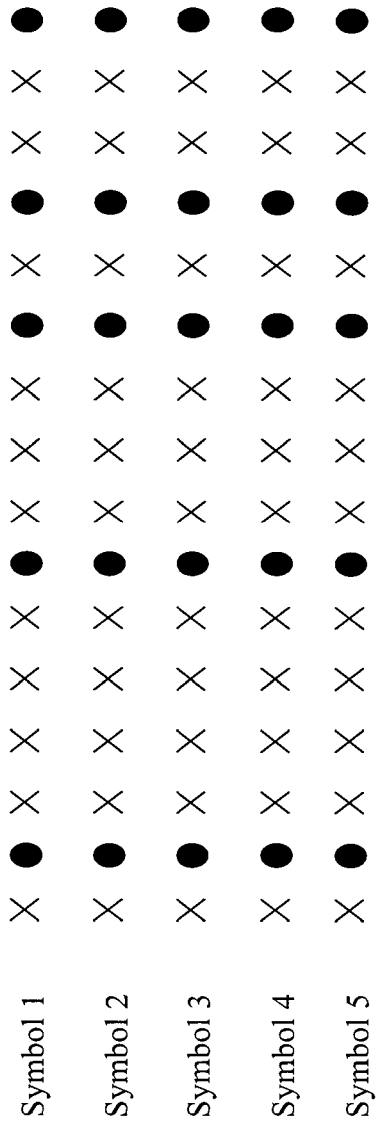
FIG. 2 shows an example number of consecutive OFDM symbols obtained from consecutive FFTs in accordance with various aspects of the present disclosure.

FIG. 2 shows an example number of consecutive OFDM symbols obtained from consecutive FFTs in accordance with various aspects of the present disclosure. Each row in the figure (symbol 1-symbol 5) corresponds to an output of the FFT, referred to as OFDM symbols. Individual samples of the FFTs (or symbols) are marked by crosses and circles. These are also called FFT bins and in OFDM terminology these are called OFDM carriers. These carriers are amplitude and phase modulated.

The OFDM carriers can be pilot carriers or data carriers. Pilot carriers are transmitted to help the receiver synchronize and get at the data carriers which actually contain the information. Pilot carriers are also modulated, but the modulation sequences are pseudo-random sequences that are known to the receiver. These modulation sequences are typically defined as part of the standardization process.

There are different types of pilots. In this application, we initially refer to the continuous pilots (CPs). These are the pilots that occur at the same frequency position in all the symbols. These are indicated by circles in FIG. 2. These are fairly randomly spaced in the symbol. FIG. 2 shows these carriers being spaced fairly close to each other. This is just for illustration. In actual applications, there could be many data carriers (50, 100 or more) between successive CPs.

The pattern of CP indices (i.e. locations) will be known from digital TV standard, but the actual locations will be a frequency shifted (positive or negative) version of this because of the unknown frequency offset. For example, the pattern may be {1, 6, 10, 12, 15}. The actual locations could be {2, 7, 11, 13, 16} or {100, 106, 110, 112, 115}. So the first step is identifying this offset. This offset will give the frequency offset. This can then be corrected using the complex multiplier of FIG. 1 to remove this offset. During initial signal acquisition there could be unknown frequency offsets. Then the actual locations of the CPs will not be known. For example, the pilot pattern v can be shown as {CP_indices(v)}. Where the actual pilots end up is {CP_indices(v)+L} where L is the frequency offset measured in units of frequency spacing between successive carriers of the OFDM symbol produced by the FFT.

FIG. 3 shows one vertical column of the OFDM symbols (that is, one specific carrier k in a succession of OFDM symbols) including the computation of the first and second difference in phase angles between consecutive OFDM symbols of FIG. 2. In the figure, an unknown OFDM carrier k of a sequence of symbols 1, 2, 3, 4, 5 and 6 is shown as a box because it is unknown if the carrier is a data carrier or a pilot carrier, due the frequency offset.

In some aspects, in order to determine this frequency offset and the pattern of continuous pilots, all OFDM carriers are converted from Cartesian to polar coordinates as follows $$(x+jy)_k^n \rightarrow R_k^n \exp(j\Phi_k^n) \qquad (1)$$

where the superscript, n, indicates the symbol number and the subscript, k, indicates the carrier number in the symbol. Thus, referring to FIG. 3, for symbol 1, the complex number is $R_k^1 \exp(j\phi_k^1)$; for symbol 2, the complex number is $R_k^2 \exp(j\phi_k^2)$; for symbol 3, the complex number is $R_k^3 \exp(j\phi_k^3)$; for symbol 4, the complex number is $R_k^4 \exp(j\phi_k^4)$; for symbol 5, the complex number is $R_k^5 \exp(j\phi_k^5)$; and for symbol 6, the complex number is $R_k^6 \exp(j\phi_k^6)$.

The first difference in phase angles between symbol 2 and symbol 1 is given by $\Delta\phi_k^2 = \phi_k^2 - \phi_k^1$; between symbol 3 and symbol 2 is given by $\Delta\phi_k^3 = \phi_k^3 - \phi_k^2$; between symbol 4 and symbol 3 is given by $\Delta\phi_k^4 = \phi_k^4 - \phi_k^3$; between symbol 5 and symbol 4 is given by $\Delta\phi_k^5 = \phi_k^5 - \phi_k^4$; between symbol 6 and symbol 5 is given by $\Delta\phi_k^6 = \phi_k^6 - \phi_k^5$.

The second difference in phase angles between symbol 3 and symbol 2 is given by $\Delta^2\phi_k^3 = \Delta\phi_k^3 - \Delta\phi_k^2$; between symbol 4 and symbol 3 is given by $\Delta^2\phi_k^4 = \Delta\phi_k^4 - \Delta\phi_k^3$; between symbol 5 and symbol 4 is given by $\Delta^2\phi_k^5 = \Delta\phi_k^5 - \Delta\phi_k^4$; and between symbol 6 and symbol 5 is given by $\Delta^2\phi_k^6 = \Delta\phi_k^6 - \Delta\phi_k^5$.

Note that the subscript is always k. This is because everything in FIG. 3 refers to the same carrier k over 6 successive symbols.

If the chosen carrier corresponds to a CP then the second difference of the phase angle approximates zero. Therefore, $\exp(j\Delta^2\phi_k^n)$ approximates 1.0 if k happens to correspond to a CP location. For all other carriers, the above expression will correspond to a random complex number. The average of these $\exp(j\Delta^2\phi_k^n)$ values over the known pattern of CP indices, for example k∈{1, 6, 10, 12, 15}, is then determined. The average can also be determined for a shifted version of this pattern, for example k∈{2, 7, 11, 13, 16}, which corresponds to a shift of 1 and for a shift of −1. This average can be determined for every shift in the range in a predetermined frequency range, for example, for −100 to 100 FFT bin size. Provided the frequency offset is within ±100 FFT bin sizes, then one of these shifts will correspond to the correct set of CPs.

The average over this correct set will be close to unity because each $\exp(j\Delta^2\phi_k^n)$ in this set is close to 1.0. However, over other sets random complex number will be added and hence the average will be close to zero. So the set with the largest average will indicate the frequency offset.

In some aspects, the average $R_k^n \exp(j\Delta^2\phi_k^n)$ can be used instead of $\exp(j\Delta^2\phi_k^n)$. The difference being that each $\exp(j\Delta^2\phi_k^n)$ is weighted with its amplitude. Given that there may be noise in the system, it may be beneficial to put more emphasis on stronger components.

The purpose of the algorithm given here is to work out the following: frequency offset, pilot pattern, guard ratio (guard ratio has been estimated via time domain correlation. Hence the purpose here is to resolve the ambiguity between closely spaced guard ratios like 1/16 and 19/256 which may not have been estimated correctly by the time domain correlation.), timing offset, and spectral inversion status.

To work out the theoretical basis for this algorithm assume for a moment that a continuous pilot location is known. For this CP (say at frequency bin k of the FFT) the difference in phase between symbol n and (n−1) can be proven to be given equation (2).

$$\Delta\Phi_k^n = \Phi_k^n - \Phi_k^{n-1} \approx 2\pi(1+r)\gamma + 2\pi k(1+r)\delta - 2\pi k(\Delta r) \quad (2)$$

where $\Phi_k^n$ is a phase angle (after FFT) of carrier at frequency bin k in the OFDM symbol number n. A multi-path channel will introduce a phase shift to the transmitted carrier. It is assumed that this phase distortion is approximately the same for successive symbols. Hence this gets cancelled out when taking the first difference. Furthermore, in equation (2), δ is the fractional timing offset and Δr is guard ambiguity. For example, if the guard has been chosen as 1/16 when it is actually is 19/256, then this Δr is 3/256 (or 19/256−16/256). In other words if the OFDM symbol (including guard interval) boundaries are worked out using a guard ratio of 1/16 when the actual guard ratio is 19/256, then there will be a phase slope across the symbol corresponding to the third term of equation (2). In the first term of equation (2) the variable γ is the fractional frequency offset normalized to frequency bin spacing. It is possible to minimize this using guard correlation. Therefore the main frequency offset that is present at this time is the integer frequency offset. The effect of this integer offset is to shift the entire set of continuous pilots as a block to a different set of frequency bins. The problem of frequency estimation is to identify the amount of this shift.

It may be noted that the right hand side of equation (2) is a function of the carrier (frequency bin) index k, but it is not a function of the symbol index n. So if the second difference of equation (2) is taken the value obtained is zero.

$$\Delta^2\Phi_k^n = \Delta\Phi_k^n - \Delta\Phi_k^{n-1} \approx 0 \quad (3)$$

This provides a mechanism for identifying the shift in the CP locations due to frequency offset even when there is a timing offset and even when the guard ratio is not precisely known. Furthermore, this combined with equation (2) provides a mechanism to identify the guard ratio itself.

The algorithm is illustrated by the flow diagram of FIG. 4 and is discussed further below. The frequency search range is given by −K to K, in terms of FFT frequency bins (μ=−K, −K+1, ..., 0, ... K−1, K). The search is implemented over the eight DVB-T2 pilots patterns (v=1, 2, ..., 8). The set of FFT indices of the continuous pilots for zero frequency shift of pilot pattern v is denoted by {CP_indices(v)+0}. A right shift of this pattern by an amount u FFT bins is denoted by {CP_indices(v)+u}. The search begins with Pilot_Pattern (v=1) and ends with Pilot_Pattern (v=8). However, note that although there are eight possible pilot patterns in DVB-T2, it is not necessary to search all patterns because once the FFT size and an approximate estimate of the guard ratio is obtained then the number of possible pilot patterns can be limited to four. Hence in the flow diagram this number is shown as variable PP_Num. The maximum value of this PP_Num can be reduced to 4 thereby reducing the search space.

Since most of the frequency offset is estimated by the DVB-T2 P1 preamble symbol, the residual offset can be small. The value of K may not be greater than about 4. (In the case of DVB-T and ISDB-T the value of K could be large, say 100, but these standards have only one CP pattern and hence there is no need to search over multiple pilot patterns as in the case with DVB-T2.) So the complete search involves going through the procedure within the loop of FIG. 4 about 72 times; however, it may be possible to reduce the number of times that the loop is activated to 36 since, after acquiring FFT size and getting an initial estimate of the guard size, the number of pilot patterns can be limited to four (although there are eight in the DVB-T2 standard).

The algorithm involves working out the second difference of the phase angles for all carriers with indices {k} using successive OFDM symbols, for example three symbols n−2, n−1 and n may be used. More that three symbols may also be used. A set of complex numbers are formed using these second differences and these are summed over several symbols.

In some aspects, the algorithm begins by converting all carriers from Cartesian to Polar coordinates:

$$(x+jy)_k^n \rightarrow R_k^n \exp(j\Phi_k^n) \quad (4)$$

where $\Phi_k^n$ is the phase angle (after FFT) of carrier at frequency bin k in the OFDM symbol number n. In some aspects, this step of conversion is not necessary, as further discussed below.

Next, the second difference ($\Delta^2 \Phi_k^n$) for each carrier using three successive symbols is determined according to:

$$\Delta \Phi_k^n = \Phi_k^n - \Phi_k^{n-1} \quad (5)$$

$$\Delta^2 \Phi_k^n = \Delta \Phi_k^n - \Delta \Phi_k^{n-1} \quad (6)$$

These second differences are then converted to Cartesian coordinates. The pilot amplitude may or may not be used in this conversion. If the amplitude is not used the amplitude of all the components are taken as unity as given by equation (7). If the amplitude is used the average amplitude of each carrier is taken over the three symbols and is used as in equation (8).

$$\text{Not using amplitude:} (p+jq)_k^n = \exp(j\Delta^2 \Phi_k^n) \quad (7)$$

$$\text{Using amplitude:} (p+jq)_k^n = \overline{R_k^n} \exp(j\Delta^2 \Phi_k^n), \quad (8)$$

where $\overline{R_k^n}$ is the average amplitude of each carrier taken over three symbols.

The second differences can then be summed over more symbols to improve the signal-to-noise ratio (SNR). Three symbols (n−2), (n−1) and (n) are needed to get the first sequence. A second sequence may be formed using symbols (n−1), (n) and (n+1) and be summed with the first sequence. Several such sequences may be summed.

$$(p+jq)_k = \sum_{n=0}^{M-1} (p+jq)_k^n \quad (9)$$

Each time round the loop, a candidate set of continuous pilots is chosen corresponding to a frequency offset u and a pilot pattern v. The components $(p+jq)_k$ corresponding to this set of candidate continuous pilots are summed and the absolute value taken.

$$\text{Abs\_Sum}(u, v) = \frac{1}{\text{Number\_of\_CPs}(v)} \left| \sum_{k \in \{CP\_indices(v)+u\}} (p+jq)_k \right|, \quad (10)$$

where Number_of_CPs(v) is the number of CPs of the pilot pattern v. Consider the summation in equation (10) above. From equation (3), for a CP location the second difference in phase is approximately zero. Then equation (7) will give a value close to unity for all CP locations. Hence if u and v correspond to a set of continuous pilots, equation (10) will give a coherent summation and as a result Abs_Sum will give a relatively large value. If u and v do not correspond to a set of continuous pilots, the second difference in phase angles will be random and as a result Abs_Sum will take a small value.

Hence the first stage of the algorithm includes identifying the pair (u, v) that maximizes Abs_Sum(u, v). Since different pilot patterns have different numbers of CPs it is necessary to normalize the absolute sum to a single CP by dividing by the number of CPs of the pilot pattern v denoted by Number_of_CPs(v).

In some aspects, equation (8) can be used instead of equation (7) to weight each component by the effective SNR in the summation of equation (9). If there is frequency-selective fading due to multi-path, amplitudes of some pilots could be very small and as a result those pilots may turn out to be very noisy. So multiplying by the amplitude will deemphasize the contribution of those pilots to the summation.

Figure 4:
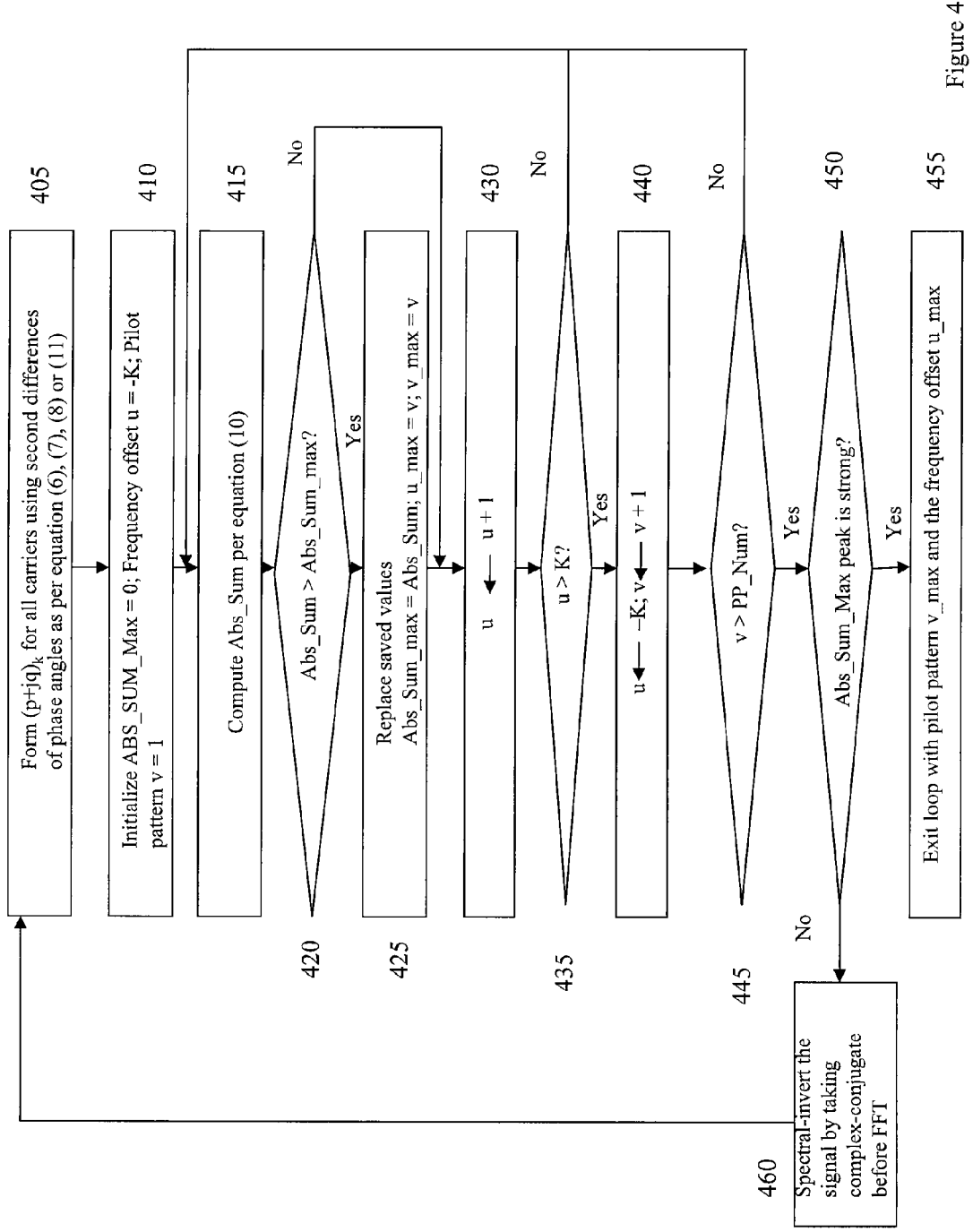
FIG. 4 shows an example flow chart for the method in accordance with various aspects of the present disclosure.

In the algorithm shown in FIG. 4, Abs_Sum of equation (10) is compared with the maximum value of this Abs_Sum up to now, i.e., Abs_Sum_Max. If it is greater than Abs_Sum_Max then the saved (u_max, v_max) pair and Abs_Sum_Max are updated. This means that the current value of the frequency offset and pilot pattern are the best so far.

In some aspects, an alternative approach to the process of repeatedly converting between Cartesian and Polar coordinates to compute the second difference in phase angles can be used. This approach includes the following:

$$R_k^n \exp(j\phi_k^n) * R_k^{n-1} \exp(-j\phi_k^{n-1}) = R_k^n R_k^{n-1} \exp(j(\phi_k^n - \phi_k^{n-1})) = R_k^n R_k^{n-1} \exp(j\Delta\phi_k^n)$$

$$R_k^n R_k^{n-1} \exp(j\Delta\phi_k^n) * R_k^{n-1} R_k^{n-2} \exp(-j\Delta\phi_k^{n-1}) = R_k^n R_k^{n-1} R_k^{n-1} R_k^{n-2} \exp(j\Delta^2\phi_k^n)$$

Here the expression $R_k^n R_k^{n-1} R_k^{n-1} R_k^{n-2} \exp(j\Delta^2 \phi_k^n)$ can be computed without any Cartesian to Polar or Polar to Cartesian conversions. Let us denote the three complex numbers as:

$$(x+jy)_k^{n-2}$$

$$(x+jy)_k^{n-1}$$

$$(x+jy)_k^n$$

Hence:

$$R_k^n R_k^{n-1} R_k^{n-1} R_k^{n-2} \exp(j\Delta^2 \phi_k^n) = (x+jy)_k^n (x+jy)_k^{n-1} (x+jy)_k^{n-1} (x+jy)_k^{n-2}$$

Hence instead of averaging $R_k^n \exp(j\Delta^2 \phi_k^n)$, we can average $$(p+jq)_k^n = (x+jy)_k^n (x-jy)_k^{n-1} (x-jy)_k^{n-1} (x+jy)_k^{n-2}. \quad (11)$$

Again, this approach does not involve any Cartesian to Polar conversion and Polar to Cartesian conversion and only involves four complex multiplications.

Thus, there are three options to determine the frequency offset including:
1. Average and select the shift or offset that maximizes the average of $\exp(j\Delta^2 \phi_k^n)$ (equation (7));
2. Average and select the shift or offset that maximizes the average of $R_k^n \exp(j\Delta^2 \phi_k^n)$ (equation (8)); or
3. Average and select the shift or offset that maximizes the average of $A_k^3 * \text{conj}(A_k^2) * \text{conj}(A_k^2) * A_k^1$ (equation (11)).

Referring to FIG. 4, the process begins at 405 where $(p+jq)_k$ as given in (9) is formed for all OFDM carriers using the second difference of phase angles according to either equation (7), (8) or (11). At 410, ABS_Sum_Max is set to zero, the frequency offset u is set to −K and the pilot pattern v is set to 1. At 415, Abs_Sum is determined according to equation (10). At 420, if it is determined that the calculated Abs_Sum is greater than Abs_Sum_Max, then the process proceeds to 425 where value of Abs_Sum_Max is set to the calculated Abs_Sum, u_max is set to u and v_max is set to v. If the calculated Abs_Sum is less than Abs_Sum_Max, the process proceeds to 430, where the value of u is incremented by 1. If u is determined to be greater than K at 435, the process proceeds to 440 where u is set to −K and the value of v is incremented by 1. If u is determined to be less than K at 435, then the process goes back to 415. At 445, a determination is made as to whether v is greater than PP_Num which is the number of pilot patterns. If the result of the determination at 445 is no, then the process goes back to 415 and if the result is yes, the process proceeds to 450. At 450, a determination is made as to whether the peak of Abs_Sum_Max is strong. If the result of the determination at 450 is yes, then the process ends at 455 where the correct pilot pattern v_max and the frequency offset u_max has been determined. If the result of the determination at 450 is no, then the process proceeds to 460 where the signal is spectrally inverted by taking the complex conjugate before performing a fast Fourier transform and the process loops back to 405.

So at the end of flow diagram of FIG. 4, two parameters corresponding to the largest Abs_Sum will be obtained. These are the frequency shift u_max and the pilot pattern v_max.

The corresponding Abs_Sum_Max may be used as a measure of confidence in the above estimate. The ratio may be taken between this and the next largest value by retaining the previous maximum values at 425. If this ratio is quite large, say greater than 2, this estimate can be taken as correct. If not another attempt may be made to get this estimate. This is because it is possible for OFDM symbols to be corrupted by impulse noise resulting from the switching on/off of electric appliances and from automobile engines.

If the peak is consistently low with reference to the second largest peak this may indicate a problem with the received OFDM signal. The most likely cause of this problem is spectral inversion, which can occur in the tuner. The impact of spectral inversion after the FFT is the reversal of all the spectral components. In other words, the FFT sequence is reverse or mirror-imaged. If this is the case, the continual pilot sequence will never be found using the above method whatever the shift u. In some aspects, the complex conjugate of the time domain signal prior to FFT is taken. So if there is no consistent and relatively strong peak Abs_Sum_Max the signal is conjugated prior to the FFT and the algorithm is repeated. This can resolve the spectral inversion state of the signal.

So now we have identified the following: spectral inversion status (corrected as well), pilot pattern used (v_max) and frequency offset (u_max).

The frequency offset can be corrected using the digital mixer in the carrier frequency recovery loop. From the pilot pattern we can also get the scattered pilot pattern. This may be important for channel estimation and equalization operations.

The next parameter to obtain is the guard ratio. To determine this we return to equation (1). Note that if $\Delta\Phi_k^n$ is plotted against the frequency index k we get a substantially straight line, which may be slightly deviate from a straight line because of noise and hence the gradient of this line may be estimated using a least square fit. This gradient is a function of two parameters. The first is the timing offset δ and the second is the guard ratio error Δr. Note that the timing offset is a function of the frequency reference (e.g., crystal) used and is unlikely to be greater than about 200 ppm, i.e., 0.0002. However, the guard ratio error can be as large as 3/256, i.e., 0.01. Hence the dominate component is the guard ratio error. Hence the guard ratio ambiguity between 1/16 and 19/256 (or in any other set of guard ratios) can be resolved using this slope calculation. To resolve between these two guard ratios, the theoretical phase slope across a symbol is determined using only the third term in the right hand side of equation (1) by setting Δr to 3/256. If the measured phase slope via least squares fit to the phase angles is closer to this than to zero then the actual guard ratio is 19/256.

However, the above algorithm for guard ratio error detection is made complicated by the fact that the phase angle slope of equation (1) can wrap fairly rapidly along the symbol. For example, if Δr is 3/256 the phase angle will wrap after about 85 carriers. Hence we use a partial phase-unwrapping and variance-based method to estimate the guard ratio error.

Once the guard ratio has been resolved then the third term in the equation (1) can be removed from all phase differences to give equation (12):

$$\Delta\Phi_k^n = 2\pi(1+r)\gamma + 2\pi k(1+r)\delta \quad (12)$$

From the slope of this it is possible to work out the timing offset and fractional frequency offset by fitting a $1^{st}$ order polynomial (line) with respect to carrier index k in (12).

In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method comprising:
    determining, by a receiver, a frequency offset in a signal comprising a set of orthogonal frequency division multiplexed (OFDM) symbols, the determining including:
        determining a first difference in phase angles between an $n^{th}$ OFDM symbol and an $n^{th}+1$ OFDM symbol on a common OFDM carrier and a first difference in phase angles between the $n^{th}+1$ OFDM symbol and an $n^{th}+2$ OFDM symbol on the common OFDM carrier, and
        determining a second difference in phase angles between the first difference in phase angles between the $n^{th}$ OFDM symbol and the $n^{th}+1$ OFDM symbol and the first difference in phase angles between the $n^{th}+1$ OFDM symbol and the $n^{th}+2$ OFDM symbol to identify the frequency offset, wherein $n \in \{1, \ldots, N\}$;
        and correcting, by the receiver, the signal using the determined frequency offset.

2. The method according to claim 1, further comprising determining a first difference in phase angles between the $n^{th}+2$ OFDM symbol and a $n^{th}+3$ OFDM symbol on the common OFDM carrier and determining a second difference in phase angles between the first difference in phase angles between the $n^{th}+1$ OFDM symbol and the $n^{th}+2$ OFDM system and the first difference in phase angles between the $n^{th}+2$ OFDM symbol and the $n^{th}+3$ OFDM symbol.

3. The method according to claim 2, further comprising repeating the determining the first difference and the second difference in phase angles for each OFDM symbol in the set $n \in \{1, \ldots, N\}$.

4. The method according to claim 1, further comprising determining if the common carrier in the $n^{th}$, $n^{th}+1$ and $n^{th}+2$ OFDM symbols corresponds to a continuous pilot (CP) based on the determined second difference in phase angles.

5. The method according to claim 3, further comprising converting one or more OFDM carriers signals in the OFDM symbols from a Cartesian to a Polar coordinate system according to $$(x+jy)_k^n \to R_k^n \exp(j\Phi_k^n)$$

where $\Phi_k^n$ is the phase angle of carrier at frequency bin k in the OFDM symbol number n and $R_k^n$ is the amplitude of carrier at frequency bin k in the OFDM symbol number n.

6. The method according to claim 3, further comprising converting the second difference of the phase angle to Cartesian coordinates according to $$(p+jq)_k^n = \exp(j\Delta^2\Phi_k^n)$$

where $\Phi_k^n$ is the phase angle of carrier at frequency bin k in the OFDM symbol number n.

7. The method according to claim 3, further comprising averaging $(p+jq)_k^n = (x+jy)_k^n (x-jy)_k^{n-1} (x-jy)_k^{n-1} (x+jy)_k^{n-2}$ where $(x+jy)_k^n$ is the carrier at frequency bin k in the OFDM symbol number n.

8. The method according to claim 1, further comprising averaging complex exponential functions of the determined second difference in phase angles over a known pattern of CP indices.

9. The method according to claim 8, wherein the averaging is a weighted average based on an average amplitude of each OFDM carrier.

10. The method according to claim 9, further comprising determining an offset that maximizes the magnitude of the average of the complex exponentials of the determined second difference weighted by the average amplitude of each OFDM carrier.

11. The method according to claim 7, further comprising determining a candidate set of continuous pilots corresponding to a frequency offset u and a pilot pattern v that maximizes $$\text{Abs\_Sum}(u, v) = \frac{1}{\text{Number\_of\_CPs}(v)} \left| \sum_{k \in \{CP\_indices(v)+u\}} (p+jq)_k \right|,$$

where
Number_of_CPs(v) is the number of CPs of the pilot pattern v.

12. The method according to claim 11, further comprising determining a complex conjugate of a time domain signal prior to performing a FFT if the expression Abs_Sum(u,v) does not meet a predetermined threshold requirement.

13. The method according to claim 7, further comprising determining the guard ratio based on $\Delta\Phi_k^n$ by determining a slope of $\Delta\Phi_k^n$ as a function of frequency index k.

14. A computer program product comprising:
a non-transitiry computer usable medium having a computer readable program code embodied therein, said computer readable program code adapted to be executed by a processor to implement functions comprising:
determining, by a receiver, a frequency offset in a signal comprising a set of orthogonal frequency division multiplexed (OFDM) symbols, the determining including:
determining a first difference in phase angles between an $n^{th}$ OFDM symbol and an $n^{th}+1$ OFDM symbol on a common OFDM carrier and a first difference in phase angles between the $n^{th}+1$ OFDM symbol and an $n^{th}+2$ OFDM symbol on the common OFDM carrier, and
determining a second difference in phase angles between the first difference in phase angles between the $n^{th}$ OFDM symbol and the $n^{th}+1$ OFDM symbol and the first difference in phase angles between the $n^{th}+1$ OFDM symbol and the $n^{th}+2$ OFDM symbol to identify the frequency offset, wherein $n \in \{1, \ldots, N\}$; and
correcting, by the receiver, the signal using the determined frequency offset.

15. The computer program product according to claim 14, further comprising determining a first difference in phase angles between the $n^{th}+2$ OFDM symbol and a $n^{th}+3$ OFDM symbol on the common OFDM carrier and determining a second difference in phase angles between the first difference in phase angles between the $n^{th}+1$ OFDM symbol and the $n^{th}+2$ OFDM system and the first difference in phase angles between the $n^{th}+2$ OFDM symbol and the $n^{th}+3$ OFDM symbol.

16. The computer program product according to claim 15, further comprising averaging $(p+jq)_k^n = (x+jy)_k^n (x-jy)_k^{n-1} (x-jy)_k^{n-1} (x+jy)_k^{n-2}$ where $(x+jy)_k^n$ is the carrier at frequency bin k in the OFDM symbol number n.

17. The computer program product according to claim 15, further comprising determining a candidate set of continuous pilots corresponding to a frequency offset u and a pilot pattern v that maximizes $$\text{Abs\_Sum}(u, v) = \frac{1}{\text{Number\_of\_CPs}(v)} \left| \sum_{k \in \{CP\_indices(v)+u\}} (p+jq)_k \right|,$$

where
Number_of_CPs(v) is the number of CPs of the pilot pattern v.

18. A receiver comprising:
a processor; and
a non-transitory computer readable medium having a computer readable program code embodied therein, said computer readable program code adapted to be executed by the processor to determine by the receiver, a frequency offset in a signal comprising a set of orthogonal frequency division multiplexed (OFDM) symbols, the determining including:
determining a first difference in phase angles between an $n^{th}$ OFDM symbol and an $n^{th}+1$ OFDM symbol on a common OFDM carrier and a first difference in phase angles between the $n^{th}+1$ OFDM symbol and a $n^{th}+2$ OFDM symbol on the common OFDM carrier,
determining a second difference in phase angles between the first difference in phase angles between the $n^{th}$ OFDM symbol and the $n^{th}+1$ OFDM symbol and the first difference in phase angles between the $n^{th}+1$ OFDM symbol and the $n^{th}+2$ OFDM symbol to identify the frequency offset, wherein $n \in \{1, \ldots, N\}$ and
correcting, by the receiver, the signal using the determined frequency offset.

19. The receiver according to claim 18, wherein the processor is configured to average $(p+jq)_k^n = (x+jy)_k^n (x-jy)_k^{n-1} (x-jy)_k^{n-1} (x+jy)_k^{n-2}$ where $(x+jy)_k^n$ is the carrier at frequency bin k in the OFDM symbol number n.

20. The receiver according to claim 19, wherein the processor is configured to determine a candidate set of continuous pilots corresponding to a frequency offset u and a pilot pattern k that maximizes $$\text{Abs\_Sum}(u, v) = \frac{1}{\text{Number\_of\_CPs}(v)} \left| \sum_{k \in \{CP\_indices(v)+u\}} (p + jq)_k \right|,$$

where
Number_of_CPs(v) is the number of CPs of the pilot pattern v.

* * * * *